Figure 1:
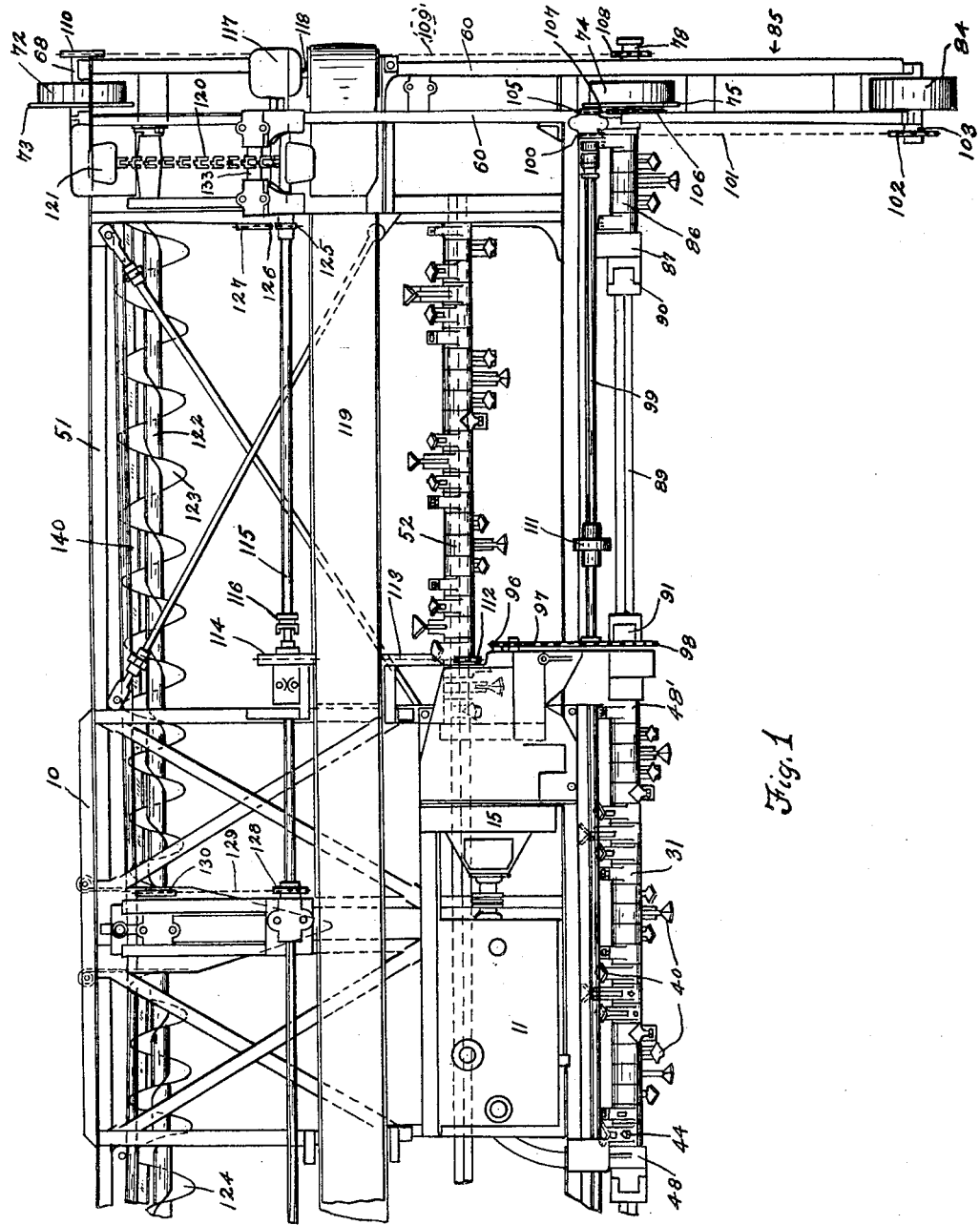

April 18, 1933.    G. MAXON, JR., ET AL    1,904,948
MECHANICAL FINE GRADER
Filed Sept. 18, 1929    6 Sheets-Sheet 1

INVENTORS
Glenway Maxon Jr & 
William Ord, Deceased by
Harriet P. Ord, Executrix Pay, Oberlin & Pay ATTORNEYS April 18, 1933.  G. MAXON, JR., ET AL  1,904,948
MECHANICAL FINE GRADER
Filed Sept. 18, 1929   6 Sheets-Sheet 2
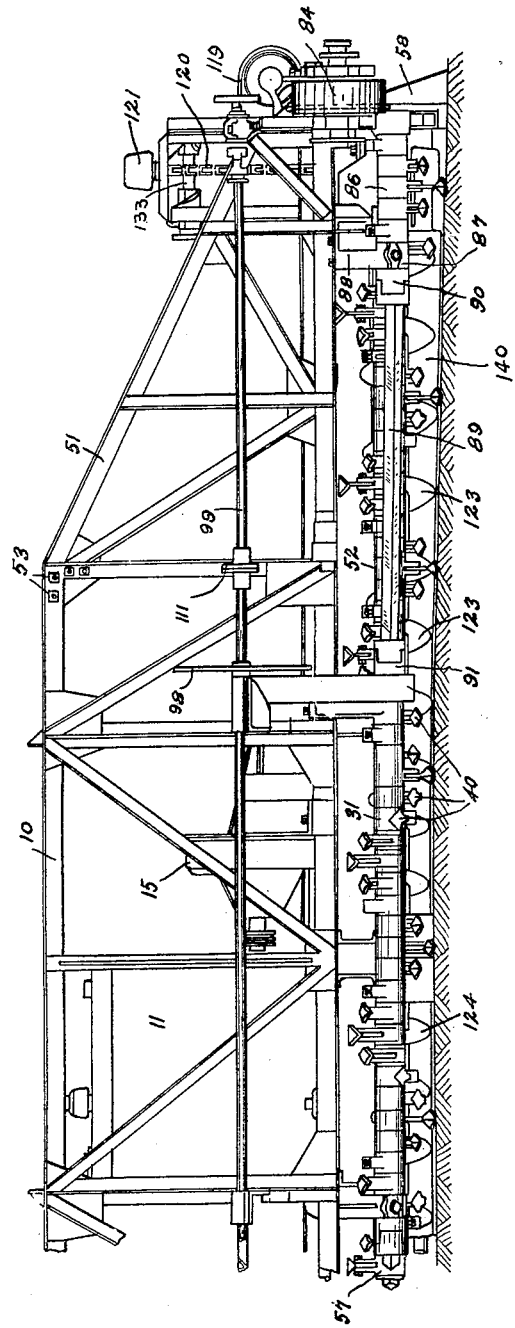
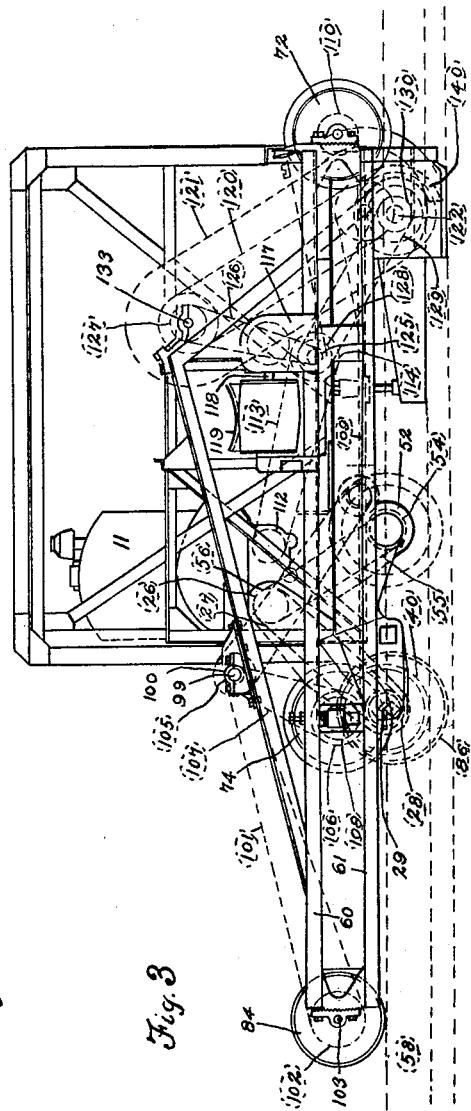
INVENTORS
Glenway Maxon Jr and
William Ord, Deceased by
Harriet P. Ord, Executrix.
Fay, Oberlin & Fay ATTORNEYS.

April 18, 1933.  G. MAXON, JR., ET AL  1,904,948
MECHANICAL FINE GRADER
Filed Sept. 18, 1929   6 Sheets-Sheet 4

INVENTORS
Glenway Maxon Jr. and
William Ord, Deceased by
Harriet P. Ord, Executrix Jay Oberlin + Fay ATTORNEYS April 18, 1933. G. MAXON, JR., ET AL 1,904,948
MECHANICAL FINE GRADER
Filed Sept. 18, 1929  6 Sheets-Sheet 5

INVENTORS
Glenway Maxon Jr. and
William Ord, Deceased by
Harriett P. Ord, Executrix Fay, Oberlin & Fay ATTORNEYS April 18, 1933.  G. MAXON, JR., ET AL  1,904,948
MECHANICAL FINE GRADER
Filed Sept. 18, 1929    6 Sheets-Sheet 6

INVENTORS
Glenway Maxon Jr. and
William Ord Deceased, by
Harriet P. Ord, Executrix Fay, Oberlin & Fay ATTORNEYS.

Patented Apr. 18, 1933

1,904,948

UNITED STATES PATENT OFFICE

GLENWAY MAXON, JR., OF CHICAGO, AND WILLIAM ORD, DECEASED, LATE OF CHICAGO, ILLINOIS, BY HARRIET P. ORD, EXECUTRIX, OF HOLLYWOOD, CALIFORNIA, ASSIGNORS TO THE ENGINEERING DEVELOPMENT COMPANY, OF CLEVELAND, OHIO, A CORPORATION OF OHIO

MECHANICAL FINE GRADER

Application filed September 18, 1929. Serial No. 393,516.

The present invention relates, as indicated, to a mechanical fine grader, and more particularly to a machine adapted to be run along the line of a projected road and automatically to prepare a sub-grade for road metal, or the like.

Among the objects of the invention are the following. The provision of a machine, automatic in character, which may be placed upon the forms which ordinarily bound the edges of a road in construction and which, under the control of an operator, will drive itself along those forms, cutting the surface between the forms to a desired contoured or arcuate shape with respect to the forms, and automatically removing the spoil so loosened from between the forms. Of course, if desired, the tractive elements of the machine, whether they are wheels or crawlers, may operate on some other surface having a preformed grade. Another object is the provision in such a machine of improved cutting means comprising a plurality of relatively small blades mounted for rotation upon a shaft extending transversely of the projected road. A further object is the provision in such a machine of a plurality of such shafts, each carrying such a series or gang of cutters, the shafts being staggered and overlapping at their ends. A further object is the provision of means for driving the tractive wheels of a machine of the character described and for driving the cutter shafts in the opposite direction, whereby, as the machine moves forward, the cutters will engage the surface of the material to be removed while said cutters are moving in the direction of movement of the machine as a whole. A further object is the provision of such a machine in which the tractive effort of the wheels on the forms and the cutting effort of the blades on the material to be cut are so related that, when a blade strikes a relatively immovable object, the tractive effort of the wheels will be overcome and the machine as a whole will be kicked back, whereby the blade is given an opportunity to strike such object a plurality of successive blows, taking a small bite at each blow, until the resistance of the object in question is overcome.

Further objects of the invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 4:
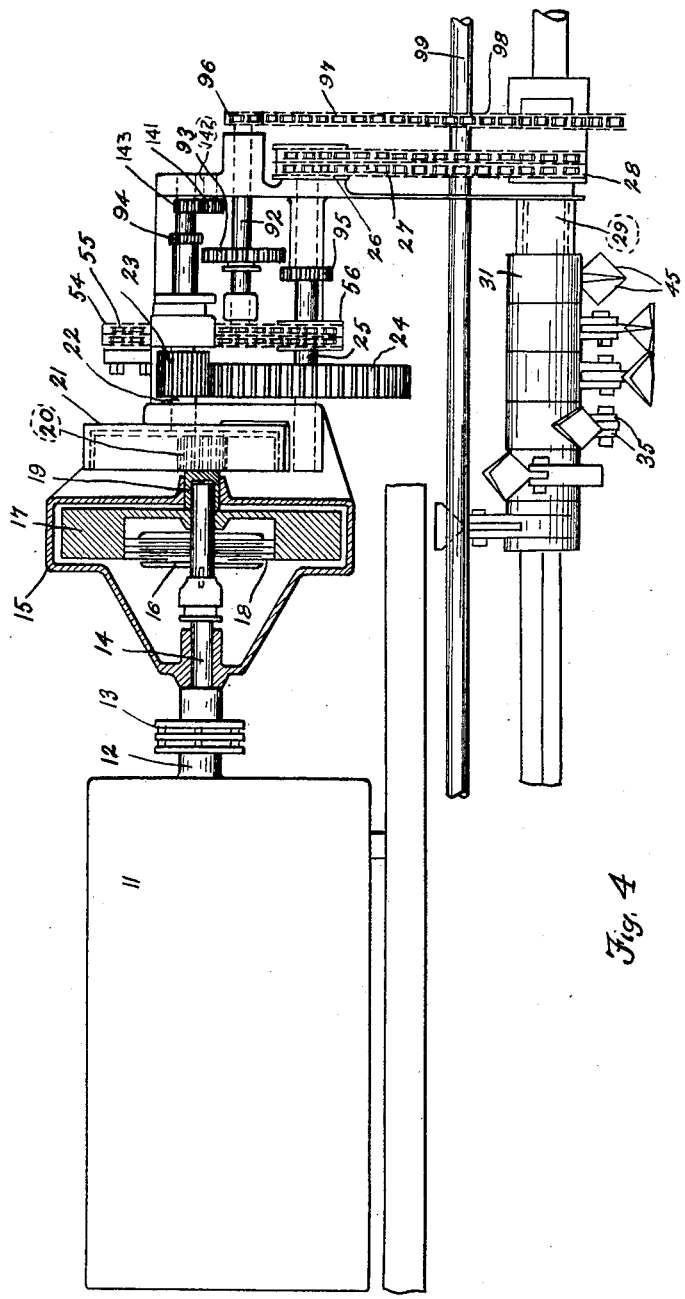
Figure 5:
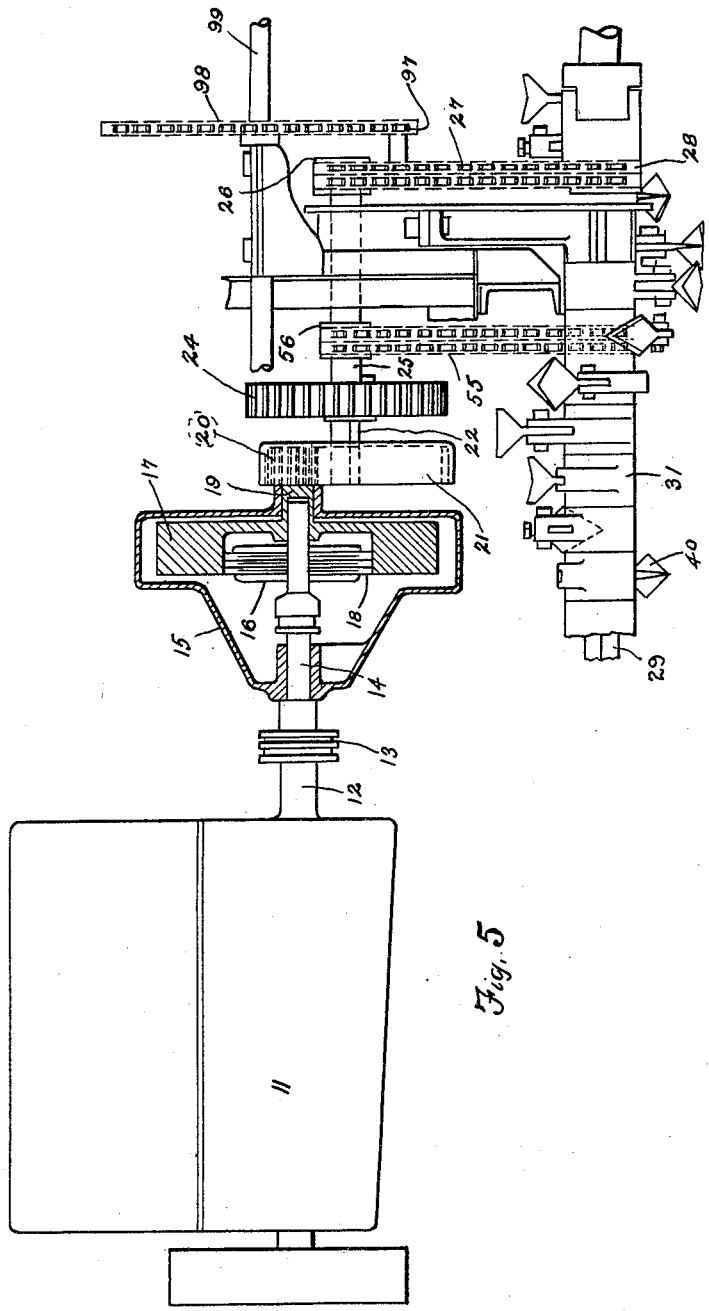
Figure 6:
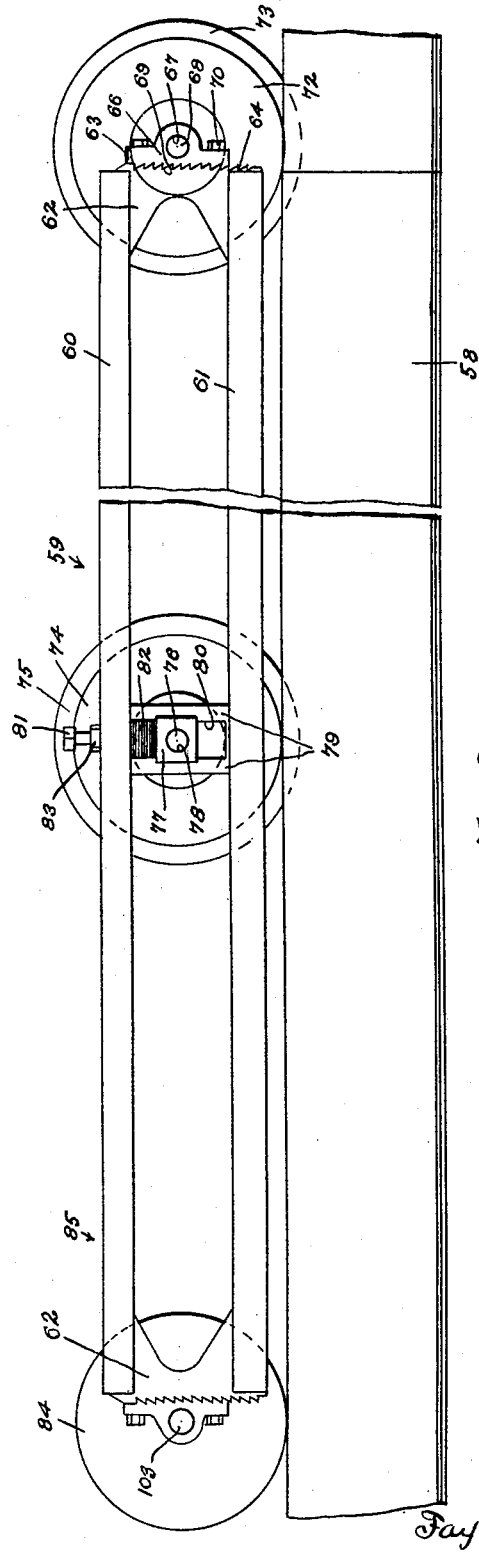
Figure 7:
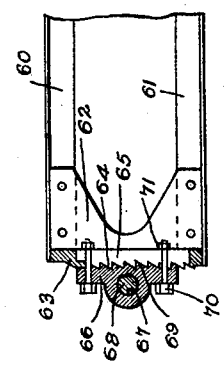
Figure 8:
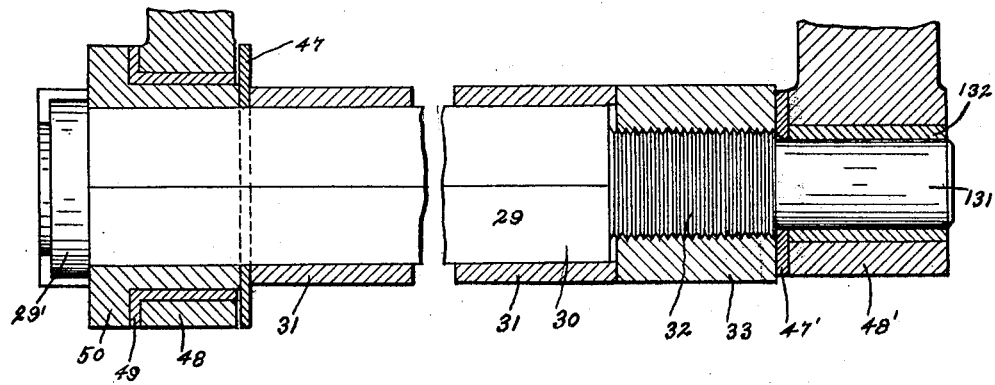
Figure 9:
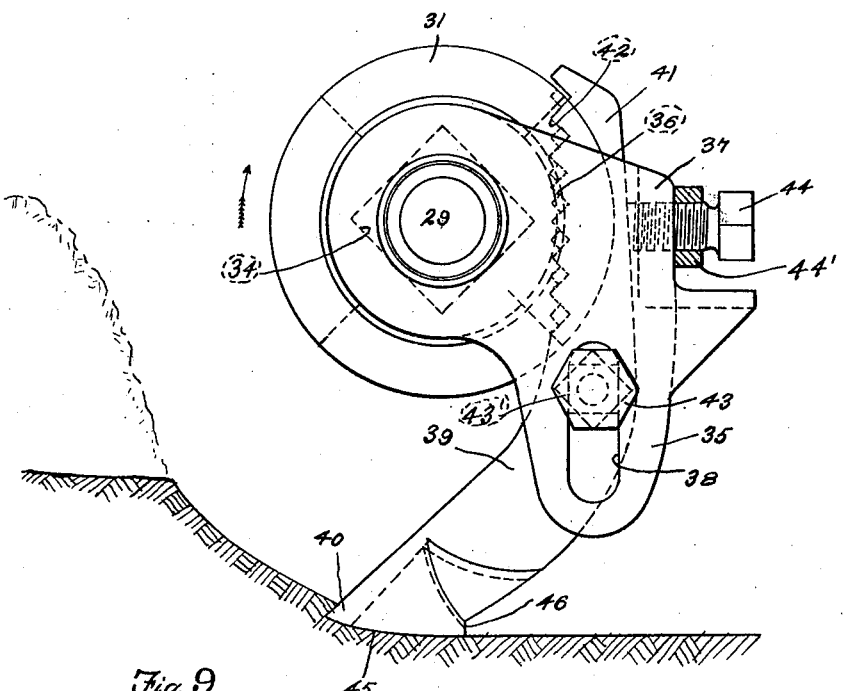
Figure 10:
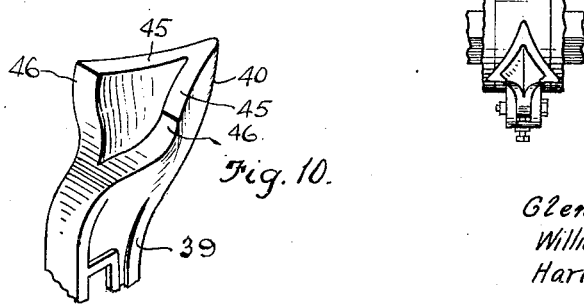
Figure 11:
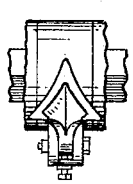

In said annexed drawings;

Fig. 1 is a plan view of slightly more than one-half of the machine, it being understood that that side of the machine which is not shown is substantially identical with that which is shown; Fig. 2 is a front elevation of the same portion of the machine; Fig. 3 is a side elevation looking at the machine from the right side of Fig. 2; Fig. 4 is an enlarged fragmentary plan view of the prime mover and a portion of the connecting train comprising the drive mechanism; Fig. 5 is a front elevational view of the details disclosed in Fig. 4; Fig. 6 is an enlarged broken view of one truck or side frame section; Fig. 7 is a vertical side sectional view through an end of one of the trucks disclosing means for adjusting the position of the truck with respect to a wheel; Fig. 8 is an enlarged detail view, partly in section, of one of the cutter shafts; Fig. 9 is a side elevation on an enlarged scale of one cutter, showing its relation to the material to be cut when in operation; Fig. 10 is a broken perspective of a cutter; and Fig. 11 is a view showing the relation of the width of each cutter and the lengths of its hub.

In the past it has been very difficult and expensive to form the final grade upon which road metal is to be placed. This work has customarily been done very roughly by machines and then finished off by hand. The present machine is capable of taking a fairly deep cut, and can finish accurately to the exact sub-grade required after the completion of the rough grading processes. The machine further is applicable to the work of removing an old pavement of any of the softer types and simultaneously preparing the sub-grade accurately to the form required for the new pavement.

It has long been known that a very smooth sub-grade is of great advantage over a comparatively rough one, particularly when an expensive permanent road paving material, such as concrete is used. Some of the advantages of the uniformly and accurately prepared sub-grade are that the finished road can be laid to a uniform thickness of material throughout, thus giving it a uniform strength to resist the bending loads that are caused by heavily loaded vehicles traveling over the road. When the pavement is not of a uniform thickness, there is a great tendency to break through the paving at the places where thin spots occur, such places of course corresponding to high spots in the sub-grade. This improved machine eliminates the possibility of leaving such high spots, obviating also the possibility of gouging out any low spots left by the preliminary excavating operations, and thus leaves a uniform, smooth and accurate sub-grade, upon which the road material may be deposited.

When the paving material is concrete, changes in temperature cause expansion and contraction of the entire body of the concrete. The coefficient of expansion of concrete is sufficient to cause motion between the concrete and the sub-grade, and when the sub-grade is prepared smoothly as with this machine, the relative movement between the concrete and the surface of the sub-grade can be accomplished without the increased friction that would occur if the sub-grade had high and low spots in it. This freedom of movement prevents unequal strains from being thrown on the expanding or contracting body of concrete, thus preventing a tendency to break through the entire material, due to some portion being unable to expand or contract from the fact that it is anchored to an irregularity in the sub-grade. It is thus possible to provide with this machine a sub-grade which permits the road material to expand or contract uniformly throughout its entire length. Heretofore it has not been possible to accomplish this without expensive hand finishing work on the surface of the sub-grade after it has been prepared by other machines.

As a result of the smooth sub-grade obtainable with this improved machine, and of the close control of the depth of the cut with respect to the tops of the forms, the quantity of road paving material required to be laid, per mile length of road can be accurately predetermined with a resulting saving in material over the material required by present methods. That is, the accuracy of the present machine in operation is such that the volume of the space between the subgrade and the desired road surface is held closely to a predetermined desirable constant; so that the paving material subsequently placed corresponds in volume very closely to that required by the set of specifications to which the operator is working.

Although attempts have been made in the past to cut a sub-grade by milling it, the present machine is the only one known to us which combines sufficient strength to do the work required with a weight light enough to be carried on the customary forms or rails bounding the area of the proposed road without seriously deflecting the forms from line or level, and which yet has a minimum tendency to rise from the forms during operation. In this connection, it should be noted that the major factor involved in the deformation of forms of this character by machines previously known for working on road beds has been the tendency of the machines to rise from the forms and then fall back onto them. This battering of the forms by the machine of course tends to hammer them out of line or out of the desired level. The present machine is so designed as to minimize the tendency thereof to rise from the forms during operation. One important feature in this improved machine, which, combined with the strength and light weight just referred to, enables it to accomplish the above mentioned objects, is the division of the milling cutters into sections, and the strengthening of each of these sections as hereinafter described. Another very important feature of this machine resulting partly from the use of material of high strength and light weight, and from the proportioning of the various parts of the machine, is the feature of automatically backing away from an obstruction when unable to cut it down at one pass, and attacking it successively, reducing it somewhat at each operation, until it is reduced to the sub-grade level without injury to the machine, or without the assistance of other means. In other words, the design of the machine is such that, when a cutter strikes such an obstruction, the cutter is caused to retreat or rebound so that it may again charge the obstruction. Thus the force which would otherwise spend itself in damaging the machine is put to useful work.

As a result of this very important accomplishment, it is not necessary for stones which project above the level of the finished sub-grade to be removed by hand work, and the hole left filled with dirt. The maximum limit of the stone-cutting ability of the present machine has not been determined, but it has been found that, when the upward projection of the obstruction above the sub-grade level is not sufficient to bring such obstruction above the level of the preliminary grade, the machine is able to cut away such projection.

This improved machine, when it strikes such a projecting obstacle, will mill off a portion of it and the cutter will build up a reactive pressure sufficient to overcome the forward tractive effort of the driving wheels on the forms, thus causing the machine to back away slightly. The tractive wheels will again advance the machine until the cutter attacks the object the second time, again reducing it, although the reactive force of the cutter throws the machine backward the second time. This action is repeated successively with the obstacle being reduced somewhat at each operation until the projecting portion of the obstacle is reduced to the level of the finished sub-grade, after which the machine proceeds forward in the regular manner. These advancing and retreating operations just described are completely automatic, resulting from the structural nature of the machine, and require no special controlling manipulation by the operator. It can easily be understood that the finished surface of the road bed after an obstruction has been thus reduced has at that point a permanent hard spot, which provides an excellent support for the road material instead of a weak spot such as would result if the obstacle had to be dug out by hand, and the hole filled up with dirt, as is customarily done.

As will appear very clearly during a reading of the present application, the present machine is designed to cut to a very accurate level or sub-grade. It will be obvious that it is essential to the formation of a proper sub-grade for road metal that there shall be no lines of unevenness extending transversely of the sub-grade. It will also be obvious that, in order to prevent the formation of such lines of unevenness, it is essential that the machine shall have great strength to resist tendencies to vertical deflection. As will become obvious as the specification is perused, the action of the cutters is such as to tend to cause such deflection, and consequently great care has been given to the designing of a frame for the machine which shall have a high resistance to deflection from its normal, substantially horizontal plane. This resistance has been built into the frame, in spite of the relatively light weight of the members of which the frame is built, by careful truss design, and the resulting rigidity of the frame is considered as an important feature of the present invention.

*Main frame section and associated parts*

As disclosed herein, the machine of this invention comprises a main frame section 10 upon which is mounted a motor 11. Referring to Figs. 4 and 5, it will be seen that the motor 11 (which may, of course, be any type of prime mover) is provided with a spindle 12 to which, through the medium of a flexible connection 13, there is connected a shaft 14. Said shaft is journaled in the housing 15 and carries there-within one or more clutch plates 16. Also journaled within the housing 15 is a fly wheel 17 which carries one or more clutch plates 18 adapted to cooperate with the plates 16, whereby said fly wheel 17 may be clutched to said shaft 14.

The fly wheel is provided with a spindle 19 upon which is mounted a pinion 20 meshing with an internal gear 21, on a shaft 22, suitably journaled in the frame. Said shaft 22 carries a pinion 23 in mesh with a gear 24 mounted upon a shaft 25 upon which is also mounted a sprocket 26. A chain 27 is driven by said sprocket 26 and in turn drives a sprocket 28 on a shaft or arbor 29 disposed transversely of the frame 10.

*Cutters*

Referring now to Fig. 8, it will be seen that the shaft 29 comprises a polygonal section 30 upon which are mounted a plurality of hubs 31 internally formed to fit said portion 30. While the major portion of said shaft 29, is as shown, polygonal in cross-section, adjacent its one end, said shaft is provided with a reduced portion of circular cross-section, said portion being threaded as at 32. One hub 33 of the series mounted upon the shaft 29 is internally threaded for cooperation with the threaded portion 32 for a reason later to be described.

The details of the hubs 31 are most clearly shown in Fig. 9. It will be seen that each of these hubs is provided with a polygonal transverse bore or aperture 34 for engagement on the polygonal portion 30 of the shaft 29. Each hub is further provided with a pair of spaced ears 35 (see also Fig. 4) providing a groove, the inner surface of which is formed with a plurality of transversely extending teeth 36. Said ears 35 are joined by a web 37 adjacent their one end, and in their other ends are provided with registering elongated slots 38. A cutter 39 is adapted to be mounted in the slot of each of said hubs, said cutter comprising a curved bar provided at its one end with a plow-shaped blade 40 and formed at its opposite end as a shank 41 provided with a plurality of transversely extending teeth 42. As is clearly shown in Fig. 9, the teeth 42 are formed with a pitch which is double the pitch of the teeth 36. Stated in other language, it is to be noted that the number of teeth 36 per inch upon the surface of the hub is double the number of teeth 42 per inch upon the shank 41, whereby a tooth 42 engages every second tooth 36. This arrangement permits of fine adjustment, while providing for sufficient strength in the teeth to prevent any possibility of stripping. In assembling the cutter with its hub, the shank 41 is inserted in the slot between the ears 35 and a pin or bolt 43 is passed through the slots 38 and through an appropriate aperture in the cutter 39, said bolt being then secured in position by means of a nut 43'. It will be seen that the bolt 43 can be considered a pivot for the cutter 39. A set screw 44 is threaded through the web 37 and engages the shank 41, whereby the teeth 42 may be jammed into engagement with the teeth 36 of the hub, said screw being secured in adjusted position by means of a lock nut 44'. As will be obvious, the bolt 43 and slots 38 comprise an adjustable connection for the cutter 39 with the hub 31, and the teeth 36 and 42, in connection with the set screw 44, comprise means for positively holding the cutter 39 in adjusted position with respect to the hub 31.

Furthermore, the cutter 39 is formed of very hard material, such as hardened alloy steel, while the hub is a relatively soft iron or steel casting. If the hub is rotated in the direction of the arrow in Fig. 9, the point of the blade 40 will meet a resistance which tends to rotate the cutter 39 in a counterclockwise direction, as viewed in Fig. 9, about the bolt 43 as a pivot. This tendency, of course, results in forcing the teeth 42 still more firmly into engagement with the teeth 36; so that the action of the cutters has in itself a tendency to maintain the cutters in adjusted position.

It may here be noted that the plow ends 40 of the cutters 39 are so formed that all points in the cutting blades 45 thereof (see also Fig. 4) are substantially equidistant from the center of rotation of the shaft 29. It will also be noted that the blades are perpendicularly relieved at their rear ends, as at 46, to provide for self-sharpening of the blades in their normal operation. As is clearly shown in Figs. 1, 2 and 11, the lateral width of each blade 45 is greater than the length of its respective hub 31. That is, the length of the edge extending from the tooth point to its rear corner, when projected on a plane parallel to a vertical plane passing through the axis of the hub, when the cutter is in its extreme upper or lower position, exceeds one-half the length of the axis of said hub. This arrangement provides for an overlapping of adjacent cutters, thus substantially lessening any tendency to form ridges in the sub-grade between the various teeth, even after some wear of the teeth.

Reenforcement of cutter shafts

The shaft or arbor 29, and the other cutter shafts or arbors of the machine corresponding to the member 29, are of too light construction to resist bending. The comparatively low bending strength of these small shafts has been compensated in the following manner.

It will be understood that the shaft 29, for instance, is journaled at its opposite ends in bearings 48 and 48' suspended from the frame 10. Adjacent the point at which the threaded portion 32 is formed, the shaft 29 is provided with a reduced cylindrical portion 131. This portion 131 is journaled in a bushing 132 mounted in the bearing member 48', and a washer 47' is interposed between said bushing and bearing and the hub 33. Upon the polygonal section 30 of the shaft 29 there are mounted a plurality of the hubs 31, each hub being in contact with the adjacent hubs. The polygonal portion 30 is of such dimensions that the final hub 31 projects slightly beyond the end of said section 30 to engage the hub 33. The hub 31 at the opposite end of the polygonal portion 30 abuts against a washer 47 which, in turn, engages laterally a projecting end of an adapter 50. A bushing 49 is interposed between said bearing 48 and said adapter 50, said adapter abutting an integral collar 29' on said shaft 29 and being formed with a polygonal bore for engagement on the section 30 of the shaft 29, and a cylindrical exterior surface for reception in the bushing 49. The hub 33 is provided, like the hubs 31, with a cutter 39. As the shaft 29 rotates, the reaction against the cutter carried by the hub 33 tends to cause rotation of the shaft with respect to said hub. Such rotation operates through the threads 32 to urge said hub 33 toward the left as viewed in Fig. 8. Such action, of course, jams the hubs 31 together, thus materially increasing the resistance to bending of the shaft 29.

Intermediate frame sections and associated parts

An intermediate frame section 51 carrying a shaft or arbor on which are mounted a second series 52 of cutters is adapted to be removably connected to each side of the main frame section 10 by means of a plurality of bolts 53, or the like. See Figs. 1 and 2. Referring to Figs. 3, 4 and 5, it will be seen that the frame section 10 carries a sprocket 54 to which one end of the shaft carrying the cutter series 52 may be connected. Said sprocket 54 is driven through a chain 55 by a sprocket 56 mounted on the shaft 25. As is clearly shown in Fig. 1, the series of cutters 52 overlaps the series of cutters on the shaft 29. A further series of cutters 57 is aligned upon a transverse axis with the series of cutters 52 on the opposite side of the machine, said last-named series being carried by the other intermediate frame 51 (see Fig. 2). While it has been stated that the series of cutters 52 is "carried by" the intermediate frame 51, it will be understood that one end of the shaft carrying the series 52 may actually be supported in a bearing upon the main frame 10. The phrase "carried by", as used in the above statement and in the claims appended hereto has been used to indicate the idea that each frame section with its respective series of cutters, and other attached elements, is to be considered as a unit; and consequently this phrase is to be interpreted as sufficiently broad to cover a structure in which the carried elements are wholly and solely supported by the frame section in question, or a structure in which the carried elements are supported partially by the frame section in question and partially by some other frame section, so long as the carried elements are adapted to be removed from the machine or introduced into the machine with the frame section in question.

*Trucks*

It will be remembered that the present machine is intended primarily for the accurate formation of sub-grades upon which concrete or other road metal is to be laid. The usual practice in building concrete roads and some other types of roads is to bound the area to be paved with rail-like forms. Such forms 58 are shown in Figs. 2, 3 and 6. To the free end of each of the intermediate frames 51 there is adapted to be connected a truck or side frame indicated generally at 59 in Fig. 6. Each of said trucks comprises a pair of upper angle-irons or beams 60 and a pair of lower angle-irons or beams 61, said beams being connected at their opposite ends by blocks 62. Referring more particularly to Figs. 6 and 7, it will be seen that each of said blocks 62 comprises an outer surface 63 formed with a plurality of transversely extending teeth 64, said teeth being formed to provide substantially horizontal surfaces facing downwardly. In the particular embodiment illustrated, a set of such teeth is formed at each side of the surface 63, and between said sets of teeth the surface 63 is formed with a vertically extended slot 65. A bearing member 66 provided with a bore 67 for the reception of a wheel axle 68 is adapted to be removably secured to each of said blocks 62. Said member 66 is formed with a substantially plane surface provided with teeth 69 adapted to engage and cooperate with the teeth 64 of the surface 63. Bolts 70 are adapted to be passed through suitable apertures in the member 66 and through the slot 65 and to be clamped in position by means of nuts 71, or the like. It will be obvious that the slot 65 and the bolts 70 comprise means for adjustably securing the member 66 to the block 62, and that the teeth 64 and 69 cooperate, when the member 66 is clamped in position by the bolts 70, to maintain said member 66 in adjusted position. Wheels 72 provided with flanges 73 for cooperation with the forms 58 are carried by said axles 68.

As will be clearly seen, the machine of the present application is provided with three pairs of wheels. The intermediate pair of wheels 74 are provided with flanges 75 for engagement with the forms 58. The axle 76 of each of said wheels 74 is adapted to be mounted in a bore 78 in a polygonal bearing block 77. Each of said blocks 77 is provided in its opposite faces with slots for engagement with a pair of spaced guide members 79 secured between the members 60 and 61. It will be seen that each block 77 is thus mounted for vertical movement in the space 80 between said guide members 79. A set screw 81 is threaded into the member 60 in alignment with said space 80, and a plurality of removable and replaceable shims 82 are adapted to be mounted between the member 79 and between the block 77 and the set screw 81 for adjustably positioning the frame 59 with respect to the block 77, and consequently with respect to the wheel 74. A lock nut 83 is provided for said set screw 81.

The axles 76 of the wheels 74 are disposed substantially in alignment with the shaft 29 and said wheels 74 are hereinafter termed the front wheels of the machine. The members 60 and 61, however, extend a material distance forwardly beyond the point at which said axles 76 are journaled. This extending portion of the frame 59 may be considered, and is hereafter considered, a projection or extension and, in Fig. 6, is given the reference numeral 85. To the extremity of each of the projections 85 there is adjustably secured a flangeless wheel 84, said wheels being secured to the extensions by means identical with the means whereby the wheels 72 are mounted on the frames 59. It is highly desirable to provide this further point of support for the machine as an aid in preventing slight differences in level of the forms 58 from being translated literally to the sub-grade formed by the machine. It will be understood that although the forms 58 are laid with the greatest attention to the level, the foundations upon which they are laid are not uniform in solidity, or even continuous. If a machine of short wheel base and massive structure were used on the forms, deflection would naturally take place, resulting in an irregular surfaced sub-grade. It has not only been considered that the machine must be of light weight but the wheel base has been purposely lengthened out so that such irregularities as may occur in the forms are reflected by smaller, rather than greater, irregularities in the finished sub-grade. It may here be noted that the present machine has been designed with a wheel base slightly longer than the standard length of a single form unit so that the total weight borne by one side frame or truck is never thrown upon any one form unit.

The great wheel base provided by these wheels 84, however, would become a decided disadvantage in rounding a curve if all three sets of wheels were flanged, and consequently it has been deemed desirable to make the wheels 84 flangeless. It may here be mentioned that the axles 103 of the wheels 84 are so designed that they may be mounted in the bores 78 of the blocks 77, whereby, if it is desired, the wheels 84 and the wheels 74 may be interchanged.

The reason for making the position of the flangeless wheels 84 and the position of the flanged wheels 74 interchangeable will be obvious, but the same may be mentioned in passing. When a cutter adjacent one side of the machine strikes relatively solid material, a reactive force is built up, and such force tends to rotate the machine on a vertical axis. Such movement is resisted, of course, by two diagonally opposed flanged wheels in their engagement against the forms. Obviously, the side pressures on the forms exerted by reason of such reactive force varies inversely as the distance between the flanged wheels on a given form. Where the machine is in use on straight roads, or on roads having very long-radius curves, the flanged wheels 74 may be positioned at the extreme front end of the machine without disadvantage, and such positioning, increasing the flanged wheel base of the machine, reduces the force exerted by the flanged wheels on the forms resulting from the reactive force above mentioned, and consequently reduces the tendency to throw the forms out of line.

From the drawings it will be apparent that the present machine comprises a frame carrying a plurality of grade-contacting elements, independently mounted on the frame, and independently adjustable with respect to the frame. From the above description it will likewise be apparent that there has been provided not only means for independently adjusting each of the grade-contacting elements with respect to the frame, but also means for simultaneously adjusting the level of all of said elements with respect to the preliminary grade or to a given surface having the desired contour. Thus, it is possible, with the present machine, to adjust the various independently supported elements to work to a given contour and to a given depth, and thereafter, if it is desired to change the depth of cut only, this adjustment can be made without disturbing the relative positions of the various grade-contacting elements with respect to each other and to the frame; the adjustment being made by varying the positioning of the frame with respect to the tractive wheels in the manner above pointed out.

Side cutter gangs

Each side frame 59 provides a bearing for one end of a short shaft upon which is mounted a short gang of cutters 86, each of said gangs 86 slightly overlapping the outer end of the adjacent cutter gang 52 or 57. The opposite end of each of these shafts may be journaled in a bearing 87 suspended by a bracket 88 from one of the intermediate frames 51, but it will be hereinafter considered that the said shafts are "carried by" the side frames, that language being understood in the sense hereinbefore explained. A bar 89 connects the shaft on which said cutter gang 86 is mounted with the shaft 29 through the medium of a pair of universal joints 90 and 91. Of course, it is to be understood that the provision of these universal joints is desirable where high crowning is to be effected, since, in the absence of such universals, the cutter shanks adjacent each end of the machine would have to be unduly long. Consequently, the bearings for the shaft upon which the cutter gang 86 is mounted must be in a horizontal plane or planes below the horizontal plane including the shaft 29.

Traction drive

Referring now to Fig. 4 it will be seen that there is provided a shaft 92 upon which is splined a gear 93. Said gear may be slid longitudinally of the shaft 92 to mesh with a pinion 94 upon the shaft 22 for backward movement of the machine; with a pinion 95 upon the shaft 25 for slow speed forward operation; or with an idler 141 carried on a stub shaft 142 and meshing with a pinion 143 on the shaft 22 for high speed forward operation. It will be obvious that the provision of this sort of transmission is desirable, since it may sometimes be necessary to move the machine backwardly for one purpose or another, and since the machine is adapted to operate in various kinds of territory. Where the machine is in use upon soft, easily excavated earth, high speed operation is possible and highly desirable. Where, however, the machine is in use in rocky soil, or to remove an old pavement, it is necessary to move the machine forward at a slow speed in order to permit the machine properly to attack its work.

At its one end, the shaft 92 carries a sprocket 96, and a chain 97 engaged on said sprocket 96 engages also a sprocket 98 upon a shaft 99. Referring to Figs. 1, 2 and 3, it will be seen that the shaft 99 extends transversely clear across the machine. At each end, the shaft 99 carries a sprocket 100 which drives, through a chain 101, a sprocket 102 on the axle 103 of the wheel 84. Said shaft 99 further carries at each end a sprocket 105 which drives a sprocket 106 on the axle 78, through the medium of a chain 107. The axle 78 carries a sprocket 108 which, through a chain 109, drives a sprocket 110 upon the axle 68 of wheel 72. It will thus be seen that all six of the traction wheels of the machine are drive wheels, driven in the same direction and at the same speed through the shaft 99. The shaft 99 is sectional, the sections being connected by flexible joints 111 for a reason later to be described.

*Spoil removal means and drive therefor*

A sprocket 112, driven through a suitable gear train from the shaft 22, drives a chain 113 which engages a sprocket 114 on a shaft 115. The shaft 115 also is sectional, the sections being connected through joints 116. The shaft 115 carries the sprocket 125 which drives the chain 126 engaging a sprocket 127 carried on a shaft 133 suitably mounted in the machine. Said shaft further carries one of two sprockets for a bucket conveyor chain 120 upon which are mounted buckets 121. The shaft 115 carries another sprocket 128 which drives a chain 129 engaging a sprocket 130 on a shaft 122 extending transversely of the machine and carrying a helix 123 and a second helix 124. As the machine moves forwardly, the helix 123 rotates to carry spoil toward the right in Fig. 1 where the same may be picked up by the buckets 121; while the helix 124 carries spoil to the left as viewed in Fig. 1 where such spoil may be picked up by another bucket conveyor similar to that illustrated in Fig. 1. A scraper blade 140 is mounted immediately behind the helix 124, backing up such helix, and preventing the machine from riding over the spoil and leaving the same behind upon the sub-grade. The scraper 140 is preferably formed as shown with its midpoint located somewhat in advance of its lateral ends. Preferably, the scraper blade 140 is so adjusted that its scraping edge is at a level slightly above the level to which the cutters are adjusted. Such arrangement of the parts prevents any possible chattering of the scraper in engagement with the hard, uncut material, with resulting gouging of the sub-grade. It is believed the most desirable adjustment to be one which leaves from $\frac{1}{16}$ to $\frac{1}{8}$ of an inch of cut or broken material upon the surface of the sub-grade.

A shaft 118 carries a drum upon which (and upon another similar drum at the opposite end of the machine) there is mounted a belt conveyor 119. The shaft 118 may be driven by any suitable mechanism illustrated diagrammatically at 117 in Fig. 1. The mechanism 117 may be a motor, or a gear train connected to be driven by the shaft 115.

When the machine is to be operated to form a sub-grade, the same is placed upon the rails or forms 58. The individual cutters are then adjusted to provide for the desired crown curve. It will be obvious that, in view of the close adjustment of which these cutters are capable, a very accurate, smooth, and even curve can be obtained. The frame is now adjusted with relation to the traction wheels to provide for the desired depth of cut. When everything is in readiness, the operator starts the engine and, with clutch released, shifts the gear 93 into mesh with the selected drive pinion.

When the clutch 16—18 is engaged, the pinion 20 is rotated to drive the internal gear 21 on the shaft 22. The shaft 22 drives the shaft 25 and, through the pins 94, 95 or 143, the shaft 92. The various chain and sprocket connections above described between the shaft 25 and the various cutter shafts transmit the power applied to the shaft 25 to said cutter shafts, whereby the cutters are rotated in a clockwise direction as viewed in Fig. 3. From the shaft 92, the chain 97 transmits power to the shaft 99 whence power is delivered to the three sets of traction wheels 72, 74 and 84, said wheels being driven in a counter-clockwise direction as viewed in Fig. 3. Likewise, the shaft 115 is driven through the chain 113, and the chain 129 transmits rotational movement from said shaft 115 to the shaft 122 carrying the helices 123—124. The rotation of the shaft 115 is transmitted by the chain 126 to the bucket conveyor 120—121, and the belt conveyor 119 is simultaneously started in operation. As the machine moves forward, the cutters will break up whatever material they engage and will pass through such material leaving it, in broken form, upon the surface of the ground. As the helices 123—124, backed up by the scraper 140, come into contact with the broken spoil lying on the sub-grade, they will carry the same to the sides of the machine where the spoil will be picked up by buckets 121 and deposited on the belt 119 whereby the same will be carried to one side of the machine and deposited beyond the limits of the proposed road.

Let us suppose that one of the cutters 40 suddenly strikes a stone of some magnitude deeply buried in the earth, a portion of such stone extending above the level of the desired sub-grade. The stone is of such hardness that it is not immediately broken flush with the desired sub-grade, and it is sufficiently firmly embedded in the earth so that it is not dislodged by the blow struck by the cutter. As has been stated, the machine is so designed that the horizontal tangential force applied to the cutters is sufficient to overcome the tractive effect of the drive wheels on the forms 58. Consequently, when the cutter 40 strikes the supposed obstruction, the reactive force exerted by the cutter upon its shaft 29 is sufficient to overcome such tractive effect of the drive wheels and to throw the whole machine slightly backward. The result of this is that, by the time the machine has moved again to the position from which it was moved backward, the same cutter 40 has returned to the attack and will again strike the obstruction. It may be that the first two or three blows of the cutter against the obstruction will not materially affect the obstruction. As the cutter returns again and again to the attack, however, the resistance of the obstruction will be broken down, and soon the cutter will begin to chip away small particles of the obstruction, each time throwing the machine back to permit another charge by the cutter against the obstruction. This operation is repeated over and over until finally the obstruction has been milled down to the level of the desired sub-grade. Particular attention is called to the fact that his operation is entirely automatic, being an inherent function of the machine, and requiring no special manipulation by the operator of the machine.

When the machine is in operation in relatively dry territory, dust, sand and gravel are thrown up by the cutters. Consequently, it is preferable to enclose all bearings, chains, and similar moving parts to eliminate as far as possible wear caused by the presence of dust.

The practice as to the width of roads varies in different localities. Consequently, there has been provided a machine which is adapted to be used in constructing the grade for roads of varying widths. If, for instance, a nine-foot road is to be constructed, both of the intermediate frames 51 may be removed, and the side frames 59 are then connected directly to the main frame 10. This adjustment involves, of course, the removal of the bars 89 and the direct connection of the shaft upon which the cutter series 86 is mounted to the shaft 29, suitable means being provided for elevating the bearings in which the shaft carrying the cutter series 86 is mounted. Likewise, such adjustment involves the removal of sections of the shafts 115 and 122. The shafts upon which the cutter series 52 and 57 are mounted are removed with the frames 51.

It will be obvious that alternative intermediate frames 51 may be provided for use where roads of unusual widths are to be built. For instance, a machine may be so designed that, when it is assembled to include only the main or center frame section and the trucks or side frames, it will operate upon a nine-foot road width; and when the usual intermediate frames 51 are both inserted, it will operate upon a twenty-foot road width. Obviously, if only one of such intermediate frames 51 is included in the assembly, the machine will operate upon a 14½ foot road width. It will be perfectly obvious that other sizes of intermediate frames may be provided so that this same machine can be assembled to operate upon any desired road width, with a nine-foot width as its minimum, and with its maximum controlled only by the strength of the frame elements.

It will be obvious that, due to the particular shape of the blades 45 of the cutters 40, the reactive force resulting from contact of an oblique edge of a given cutter with relatively immovable object is the result of a component in the direction of the length of the road under construction and another component transverse thereto. Thus, unless a cutter strikes an obstruction absolutely squarely with its point, there is always a certain tendency to move the machine laterally. It will be appreciated that, if the cutters were more than twice as wide as the upper surfaces of the forms 58, there would be a possibility of throwing the machine off the forms because of this tendency to move laterally. For this reason, the maximum width of the blade proper 45 of each cutter 40 is less than twice the width of the rail 58. That is, the lateral distance from the point of the blade to one rear edge thereof is less than the width of any rail 58 which is likely to be encountered and which is customarily used in this class of work.

Other modes of applying the principle of this invention may be employed instead of the one explained, change being made as regards the mechanism herein disclosed, provided the means stated by any of the following claims or the equivalent of such stated means be employed.

What is claimed is:

1. A sub-grade surfacing machine having a relatively light rigid frame, wheels for moving said frame upon rails at the sides of the area to be graded, arbor mechanism carried thereby, said arbor mechanism mounted transversely to the direction of travel of the machine, pickers mounted on said arbor mechanism, power means on said frame adapted to rotate said arbor mechanism to move the pickers against the forward travel of the machine, a driving connection from said power means to the wheels, and means for dividing the power between said arbor mechanism and said wheels, the tractive force applied to said wheels being less than the force delivered horizontally by the pickers against the ground, whereby abnormal resistance encountered by the pickers will cause the machine to move backward against the continuing forward tractive effort.

2. A sub-grade surfacing machine having a relatively light rigid frame, wheels for moving said frame upon rails at the sides of the area to be graded, said machine including a plurality of arbors transverse to the direction of travel of the machine, a gang of pickers mounted on each of said arbors without laterally uncovered spaces, said arbors being in staggered relation upon said frame with ends laterally overlapping, power means on said frame adapted to rotate said arbors to move the pickers against the forward travel of the machine, a driving connection from said power means to the wheels, and means for dividing the power between said arbors and said wheels, the tractive force applied to said wheels being less than the force delivered horizontally by the picker points against the ground, whereby when said pickers encounter abnormal resistance the picking power will move the machine backward wthout stopping the forward tractive effort.

3. A sub-grade surfacing machine having a relatively light rigid frame of separable transverse sections, wheels for moving said frame upon rails at the sides of the area to be graded, said machine including a plurality of arbors transverse to the direction of travel of the machine, each arbor being supported by a section of said frame, a gang of pickers mounted on each of said arbors without laterally uncovered spaces, said arbors being in staggered relation upon said frame with ends laterally overlapping, power means on said frame adapted to rotate said arbors to move the pickers against the forward travel of the machine, a driving connection from said power means to the wheels, and means for dividing the power between said arbors and said wheels, the tractive force applied to said wheels being less than the force delivered horizontally by the picker points against the ground, whereby when said pickers encounter abnormal resistance the picking power will move the machine backward without stopping the forward tractive effort.

4. A sub-grade surfacing machine having a relatively light rigid frame made up of separable sections trussed against vertical distortion, trucks at each side of said frame for moving said frame upon rails at the sides of the area to be graded, said trucks being longer than average rail length, an arbor carried by each of said frame sections and mounted transversely of the machine, a plurality of pickers mounted on each of said arbors and rotatable in laterally adjacent paths, said arbors being in alternate arrangements both lengthwise of and across the machine, those in successive positions lengthwise of the machine being adapted to cut a path continuous each with the next, and bare shafts connecting the successive arbors across the machine, power means carried by said machine, a driving connection from said power means to said arbors adapted to rotate the arbors with the pickers opposing the forward travel of the machine, a driving connection for transmitting less power to the wheels than to the arbors.

5. In a sub-grade surfacing machine, in combination, a transverse frame, braced in plan and elevation against distortion, pickers mounted from said frame, means for driving said pickers each in a vertical circle to attack the ground on a horizontal tangent at the bottom of said circle, in a direction such that the reaction of the attack is opposed by the forward movement of the machine, and traction means for moving said machine forward with force greater than the resistance offered by normal ground to said pickers but less than the total force applied to said pickers, whereby stoppage of said pickers by an obstacle will move said machine backward without distortion of the picker mountings, and without stopping either the pickers or the traction means.

6. In a grader, a frame consisting of relatively light truss sections strongly braced and adapted to be connected side to side, an arbor supported by each of said sections, each arbor being displaced in transverse axial alignment from the arbor on the adjacent section, but in substantial transverse axial alignment with the arbor on the second section from its own, a shaft on each section in substantial transverse axial alignment with the arbors of adjacent sections, and universal connections between each said shaft and its adjacent arbors, a single driving connection to each row of arbors, said shafts serving to transmit the drive along their respective rows, said universals permitting the several arbors to be inclined according to the desired crown of the road.

Signed by us this 29 day of August, 1929.

GLENWAY MAXON, Jr.
HARRIET P. ORD,
*Executrix of the Estate of William Ord, Deceased.*